(12) United States Patent
Sakuma et al.

(10) Patent No.: US 6,971,694 B2
(45) Date of Patent: Dec. 6, 2005

(54) BUMPER APPARATUS FOR VEHICLE AND METHOD FOR ASSEMBLING THEREOF

(75) Inventors: Katsuzi Sakuma, Nagoya (JP); Shinichi Haneda, Anjo (JP); Kazunari Azuchi, Himi (JP); Kiyoichi Kita, Takaoka (JP); Gen Nishida, Aichi-ken (JP)

(73) Assignees: Aisin Seiki Kabushiki Kaisha, Kariya (JP); Aisin Keikinzoku Kabushiki Kaisha, Shinminato (JP)

( * ) Notice: Subject to any disclaimer, the term of this patent is extended or adjusted under 35 U.S.C. 154(b) by 0 days.

(21) Appl. No.: 11/088,783

(22) Filed: Mar. 25, 2005

(65) Prior Publication Data

US 2005/0212312 A1   Sep. 29, 2005

(30) Foreign Application Priority Data

Mar. 26, 2004  (JP) .............................. 2004-091829

(51) Int. Cl.⁷ ............................................ B60R 19/34
(52) U.S. Cl. ..................................... 293/133; 293/154
(58) Field of Search ............................. 293/132, 133, 293/154; 29/897.2

(56) References Cited

U.S. PATENT DOCUMENTS

| | | | | |
|---|---|---|---|---|
| 5,080,412 A | * | 1/1992 | Stewart et al. | 293/154 |
| 6,474,709 B2 | * | 11/2002 | Artner | 293/133 |
| 6,712,411 B2 | * | 3/2004 | Gotanda et al. | 293/155 |
| 6,808,215 B2 | * | 10/2004 | Sakuma et al. | 293/133 |
| 6,893,063 B2 | * | 5/2005 | Harrison et al. | 293/133 |
| 2001/0013706 A1 | * | 8/2001 | Artner | 293/133 |
| 2005/0104393 A1 | * | 5/2005 | Haneda et al. | 293/133 |

FOREIGN PATENT DOCUMENTS

JP      2000-344029      12/2000

\* cited by examiner

*Primary Examiner*—Jason Morrow
(74) *Attorney, Agent, or Firm*—Finnegan, Henderson, Farabow, Garrett & Dunner, LLP

(57) ABSTRACT

A bumper apparatus for a vehicle includes a bumper reinforcement extending in a vehicle width direction and a bumper stay fastened to one side of the bumper reinforcement and including a body extending in a front-rear direction of a vehicle and a first plate fastened to one end of the body. The first plate includes a contacting surface portion provided along the bumper reinforcement, a slanting surface portion branching from the bumper reinforcement, a first flange portion extending outside the body of the bumper stay, and second flange portions provided at both side ends of the first plate contacting with side surfaces of the body of the bumper stay.

17 Claims, 6 Drawing Sheets

FIG. 7
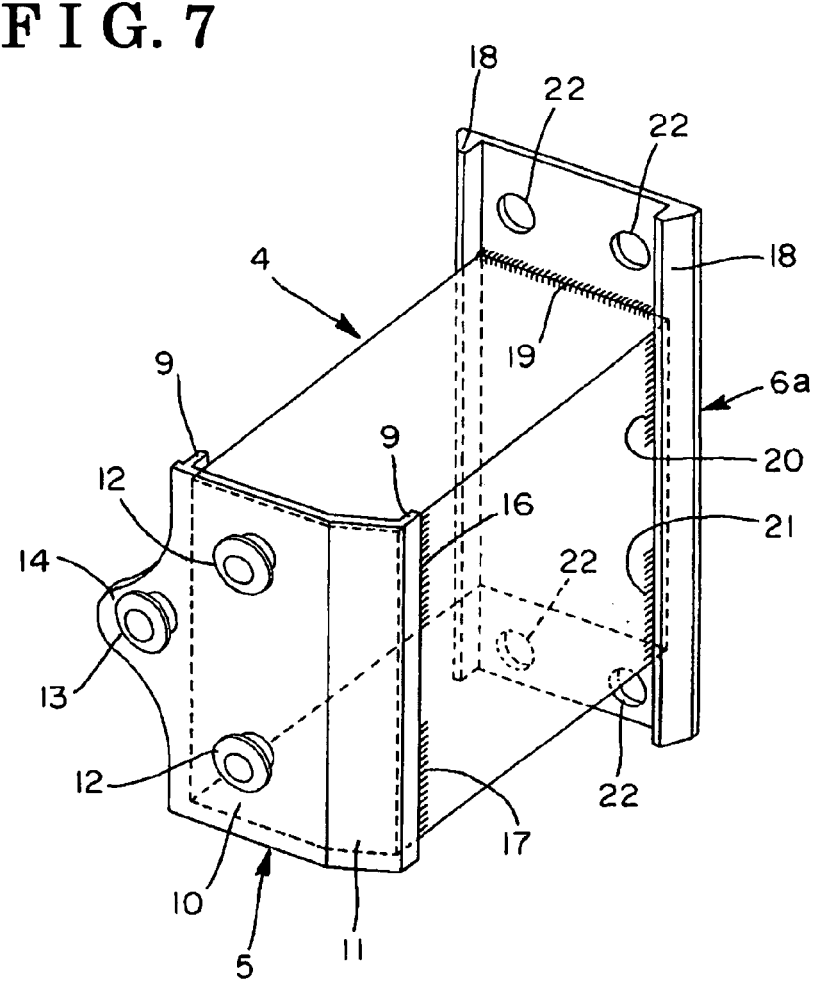
FIG. 8
FIG. 9
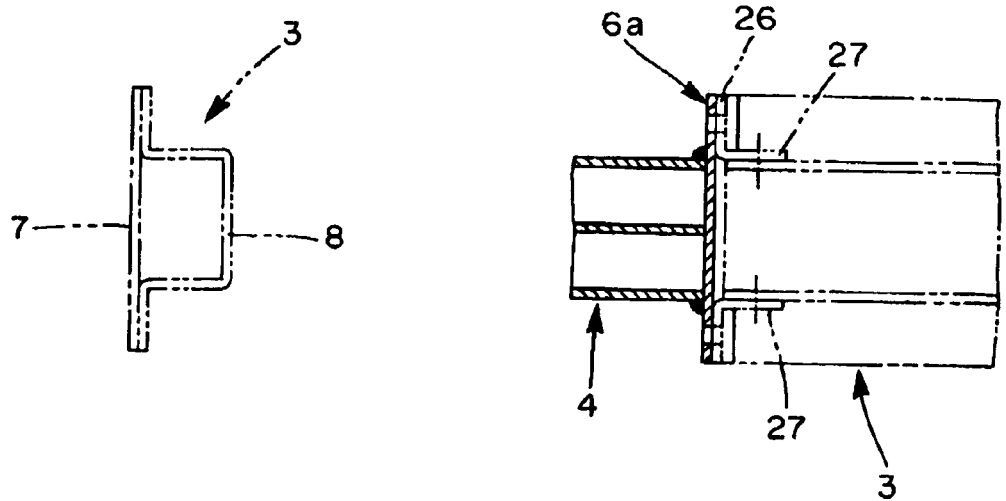

BUMPER APPARATUS FOR VEHICLE AND METHOD FOR ASSEMBLING THEREOF

CROSS REFERENCE TO RELATED APPLICATIONS

This application is based on and claims priority under 35 U.S.C. § 119 to Japanese Patent Application 2004-091829, filed on Mar. 26, 2004, the entire content of which is incorporated herein by reference.

FIELD OF THE INVENTION

This invention generally relates to a bumper apparatus for a vehicle and a method for assembling thereof. More particularly, this invention pertains to a bumper apparatus for a vehicle including a bumper stay which efficiently absorbs impact energy provided when a vehicle collides with an object in a diagonal direction or frontal direction, including the occurrence of a collision with a pole, and a method for assembling thereof in which an improvement is secured in the ease with which a bumper stay can be assembled.

BACKGROUND

A bumper apparatus for a vehicle includes a bumper reinforcement (also referred as a bumper beam) extending in a vehicle width direction, and provided at the front (and the rear) of the vehicle, side frames extending in a fore-aft direction of the vehicle, and provided at both sides of the vehicle, and a bumper stay provided between each of the side frames and each end of the bumper reinforcement for fastening each end of the bumper reinforcement to each of the side frames.

The bumper reinforcement is made by a process of extrusion molding of aluminum alloy, or by means of pressing a steel plate. A shape of a cross-section of the bumper reinforcement is generally a substantially reverse C-shape, a rectangular shape with a hollow central portion, a rectangular shape with a hollow central portion having one partition, or a rectangular shape with a hollow central portion having two parallel partitions. A document JP2000-344029A describes a bumper stay that includes a hollow body portion fastened to a bumper reinforcement, and attachment portions which form a unit with the hollow body portion.

As illustrated in FIG. 10, according to the document, the bumper reinforcement is made by a process of extrusion molding so as to make a pair of protruding portions 102, 102 at the back of the hollow bumper reinforcement 101, formed into a unit with the body portion 104 of the bumper reinforcement 101. The protruding portions 102, 102, excluding attachment portions 103, 103 that are required for purposes of attachment, are cut out from the bumper reinforcement. Flange portions 105, 105 are formed at one end of a hollow bumper stay 106.

The bumper stay 106 is attached to the bumper reinforcement 101 in the following way. First, one end of the bumper stay 106 is inserted between the attachment portions 103, 103. Next, the attachment portions 103, 103 are joined to the bumper stay 106 by means of a friction stir weld. Further, the flange portions 105, 105 are joined to a flange portion 108 of the side frame 107 by means of a friction stir weld.

According to the conventional bumper apparatus, after the bumper reinforcement 101 is formed by use of extrusion molding, substantial parts of the protruding portions 102, 102 need to be cut out. Moreover, for purposes of making the flange portions 105, 105 of the bumper stay 106, two parts of side portions provided at the other end of the bumper stay 106 need to be cut out. Cutting operations of this kind tends to influence the accuracy of dimensions in the bumper apparatus. Moreover, such operations tend to lead to a deterioration in the extrusion yield.

For joining the bumper stay 106 and the side frame 107, the flange portions 105, 105 are joined with the flange portion 108 of the side frame 107 by means of a friction stir weld. However, rigidity tends to be problematical in the joints between the flange portions 105, 105 and the flange portion 108 of the side frame 107. In particular, when a vehicle collides with an object in a diagonal direction, the joints between the flange portions 105, 105 and the flange portion 108 of the side frame 107 tend to develop weld cracks, and in consequence the level of impact energy, which the bumper apparatus can absorb, tends to diminish. Further, when the vehicle collides with an object in a diagonal direction, the joints between the attaching portion 103, 103 and the bumper stay 106, joined by means of a friction stir weld, tend to develop cracks. Improvements in a bumper apparatus are therefore desirable which will lead to solution of the problems described above.

A need thus exists for a bumper apparatus for a vehicle made by a process in which the accuracy of dimensions in the bumper apparatus can not be adversely affected easily, thus resulting in an improved extrusion yield. A need also exists for a bumper apparatus for a vehicle that has an improved level of rigidity, in particular, an improved level of rigidity in the event of a collision of the vehicle in a diagonal direction.

SUMMARY OF THE INVENTION

According to an aspect of the present invention, a bumper apparatus for a vehicle includes a bumper reinforcement extending in a vehicle width direction and a bumper stay fastened to one side of the bumper reinforcement and including a body extending in a front-rear direction of a vehicle and a first plate fastened to one end of the body. The first plate includes a contacting surface portion provided along the bumper reinforcement, a slanting surface portion branching from the bumper reinforcement, a first flange portion extending outside the body of the bumper stay, and second flange portions provided at both side ends of the first plate contacting with side surfaces of the body of the bumper stay.

According to a further aspect of the present invention, a method for assembling a bumper apparatus for a vehicle including a bumper reinforcement extending in a vehicle width direction and a bumper stay including a body extending in a front-rear direction of a vehicle and a first plate provided at one end of the body, and fastened to one side of the bumper reinforcement includes the steps of pressing a press nut to the first plate, making contact of one side of the resulting first plate with one end of the body of the bumper stay, welding the one side of the first plate onto the one end of the body of the bumper stay, making contact of the other side of the first plate with the one side of the bumper reinforcement, and fastening the first plate to the bumper reinforcement through a back wall portion of the bumper reinforcement by means of a bolt engaging with the press nut.

BRIEF DESCRIPTION OF THE DRAWINGS

The foregoing and additional features and characteristics of the present invention will become more apparent from the following detailed description considered with reference to the accompanying drawings, wherein:

FIG. 7 represents a perspective view of a bumper stay employed in the example illustrated in FIG. 6;

FIG. 8 represents a cross-sectional view as seen from arrow VIII—VIII illustrated in FIG. 6;

FIG. 9 represents a cross-sectional view as seen from arrow IX—IX illustrated in FIG. 6;

DETAILED DESCRIPTION

Figure 2:
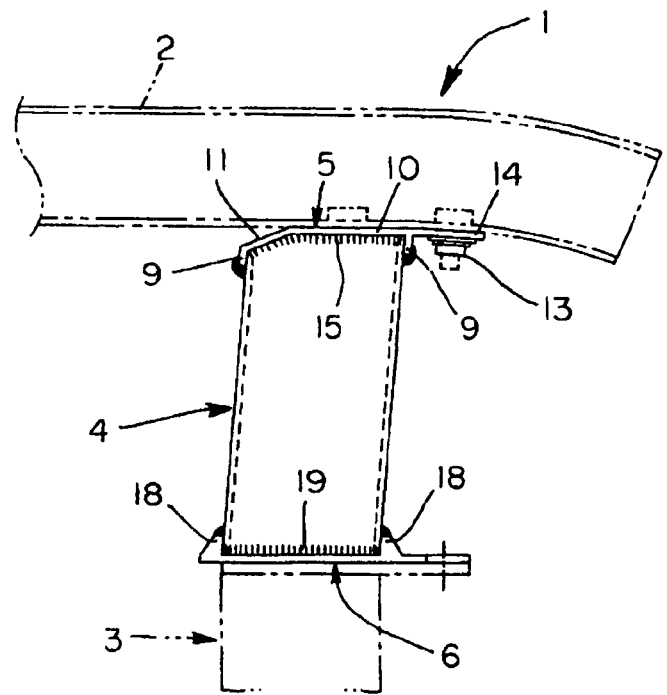
FIG. 2 represents a plane view of an example of the bumper apparatus according to the embodiment of the present invention.

An embodiment of the present invention will be explained with reference to drawing figures. As illustrated in FIG. 2, a bumper apparatus 1 for a vehicle includes a bumper reinforcement 2 extending in a vehicle width direction, a crash box, in other words, a bumper stay 4, provided between side frames 3 positioned at both sides of a vehicle body and both end portions of one side the bumper reinforcement 2, a first plate provided in front of the bumper stay 4, and a second plate provided at the rear of the bumper stay 4. The bumper reinforcement (also referred as a bumper beam) 2 is formed by a process of extrusion molding of aluminum alloy. A cross-sectional shape of the bumper reinforcement 2 is generally a substantially rectangular shape with a hollow central portion having one partition, a rectangular shape with a hollow central portion having two parallel partitions, or a rectangular shape with a hollow central portion having two crossed partitions, all of which are conventionally known configurations of hollow portions.

A shape of the side frame 3 is not limited. For example, as illustrated in FIG. 8, a side frame made by joining a plate material 7 to a hollow member 8 with a cross section of a channel shape can be utilized.

The bumper stay 4 is made from a hollow material made by a process of extrusion molding of aluminum alloy. In an example illustrated in the figures, a bumper stay is utilized of which the cross-section is a rectangular shape with a hollow central portion. However, a material made by a process of extrusion molding with another cross-sectional shape can be also utilized. The first plate 5 is welded onto the front end of the bumper stay 4. The first plate 5 is made from a material made by a process of extrusion molding of aluminum alloy, and a height of the first plate 5 is approximately equal to the height of the bumper stay 4. Flange portions 9, 9 of the protruding flange shape are provided on both sides of the first plate 5.

Figure 1:
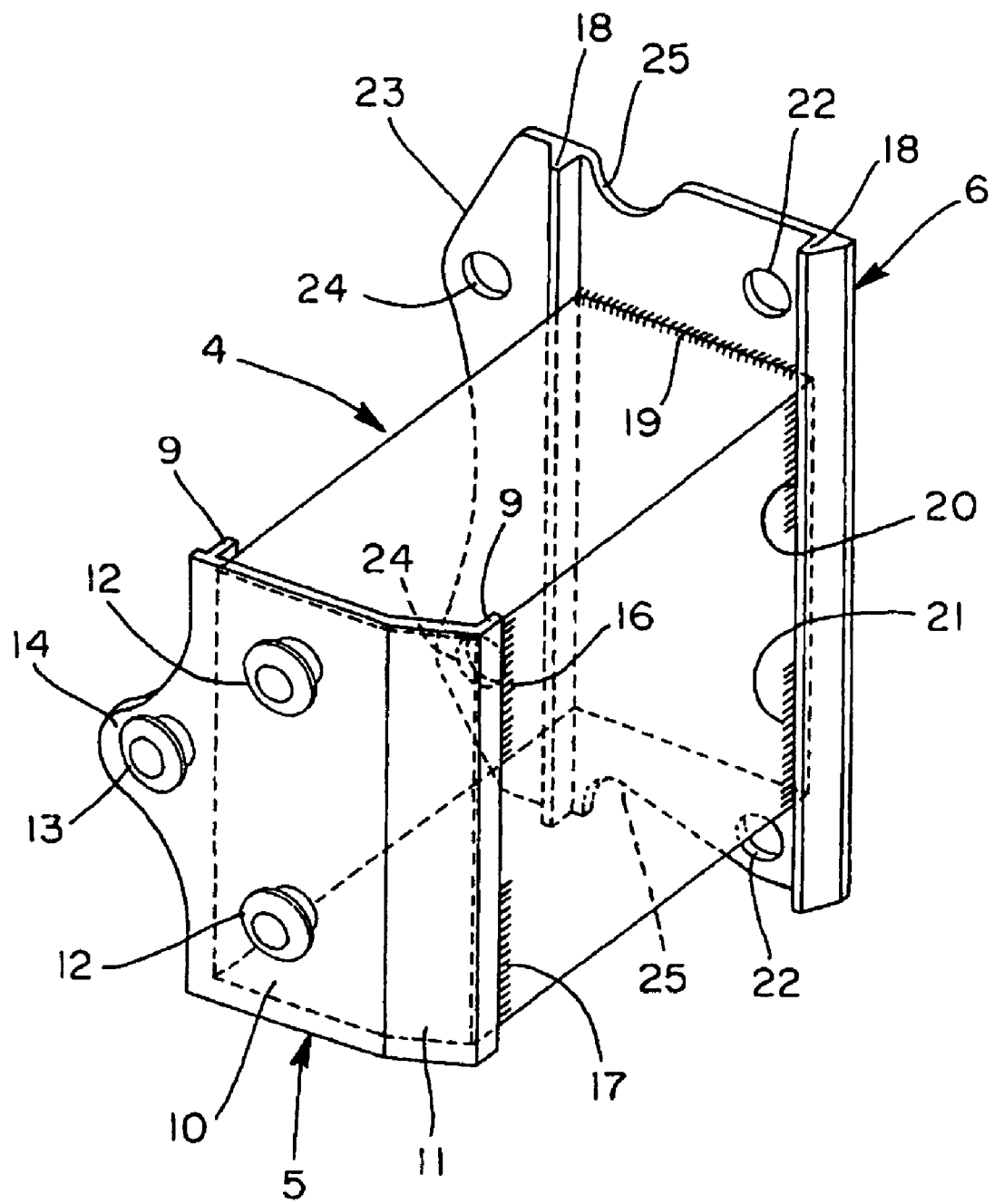
FIG. 1 represents a perspective view of a bumper stay employed in a bumper apparatus according to the embodiment of the present invention.
Figure 4:
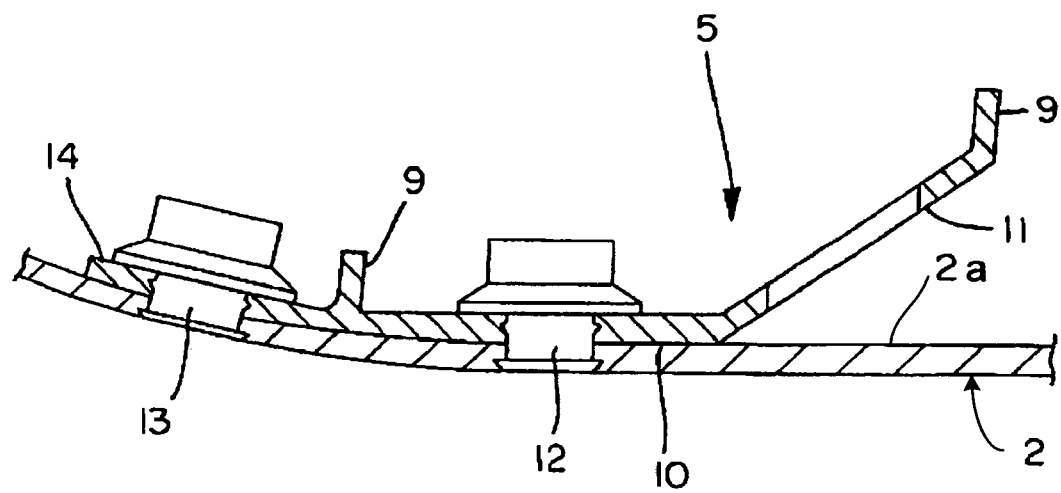
FIG. 4 represents a cross-sectional view illustrating an example of the attachment of a press nut.

The first plate 5 provided in front of the bumper stay 4 includes a contacting surface portion 10 positioned along a rear surface of the bumper reinforcement 2 and a slanting surface portion 11 branching backward from the rear surface of the bumper reinforcement 2. Plural press nuts 12 are provided at the contacting surface portion 10, at positions corresponding to the hollow portion of the bumper stay 4. Further, a flange portion 14 of the first plate 5 includes at least one of the press nuts 13. As illustrated in FIG. 4, a protruding portion provided at the tip of each press nut 12, 13 is pressed, from a rear surface of the first plate 5, into each hole provided at the first plate 5, and parts of the press nuts 12, 13 protrude from the first plate 5 towards the exterior of the first plate 5 (a step of pressing a press nut to the first plate). Residual portions of each press nut 12, 13 make close contact with the rear surface of the first plate 5. The first plate 5 into which each press nut 12, 13 has been pressed makes contact with and is welded to a body portion of the bumper stay 4, as illustrated in FIG. 1 (a step of making contact of one side of the resulting first plate with one end of the body of the bumper stay, a step of welding the one side of the first plate onto the one end of the body of the bumper stay).

The first plate 5, into which each press nut 12, 13 has been pressed, is temporarily attached to the bumper reinforcement 2 so as to insert parts of the protruding portions of each press nut 12, 13 into each hole provided at a back wall portion 2a of the bumper reinforcement 2 (a step of making contact of the other side of the first plate with the one side of the bumper reinforcement). Next, bolts are inserted through attachment holes provided at the front of the wall portion of the bumper reinforcement 2, and engaged with the press nuts 12, 13 respectively (a step of fastening the first plate to the bumper reinforcement). Thus, the bumper stay 4 is secured to the bumper reinforcement 2. When the press nuts 12, 13 are utilized, even when openings at the front and the back of the body portion of the bumper stay 4 are closed, the bolts can be easily screwed into the press nuts 12, 13 respectively. Moreover, the press nuts 12, 13 do not disengage during the process of attachment. Moreover, because the bumper stay 4 is temporarily attached to the bumper reinforcement 2, the process of attachment can be simplified and therefore improved.

Figure 5:
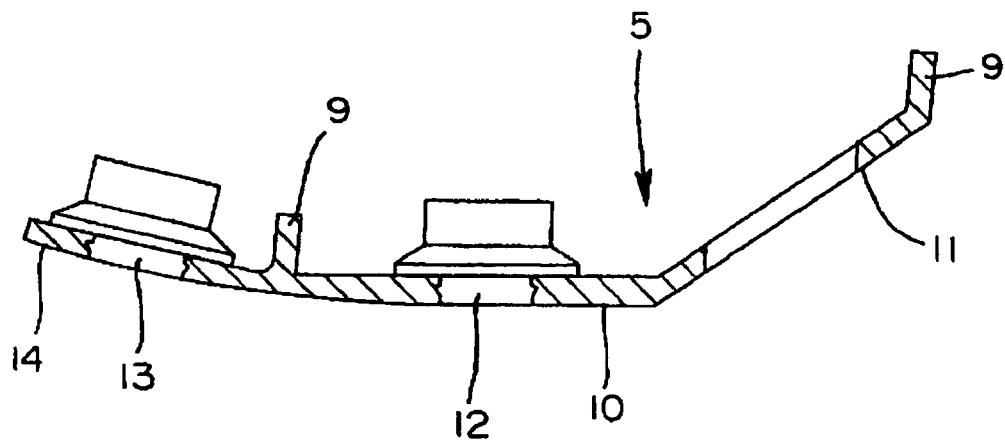
FIG. 5 represents a cross-sectional view illustrating another example of the attachment of a press nut.
Figure 6:
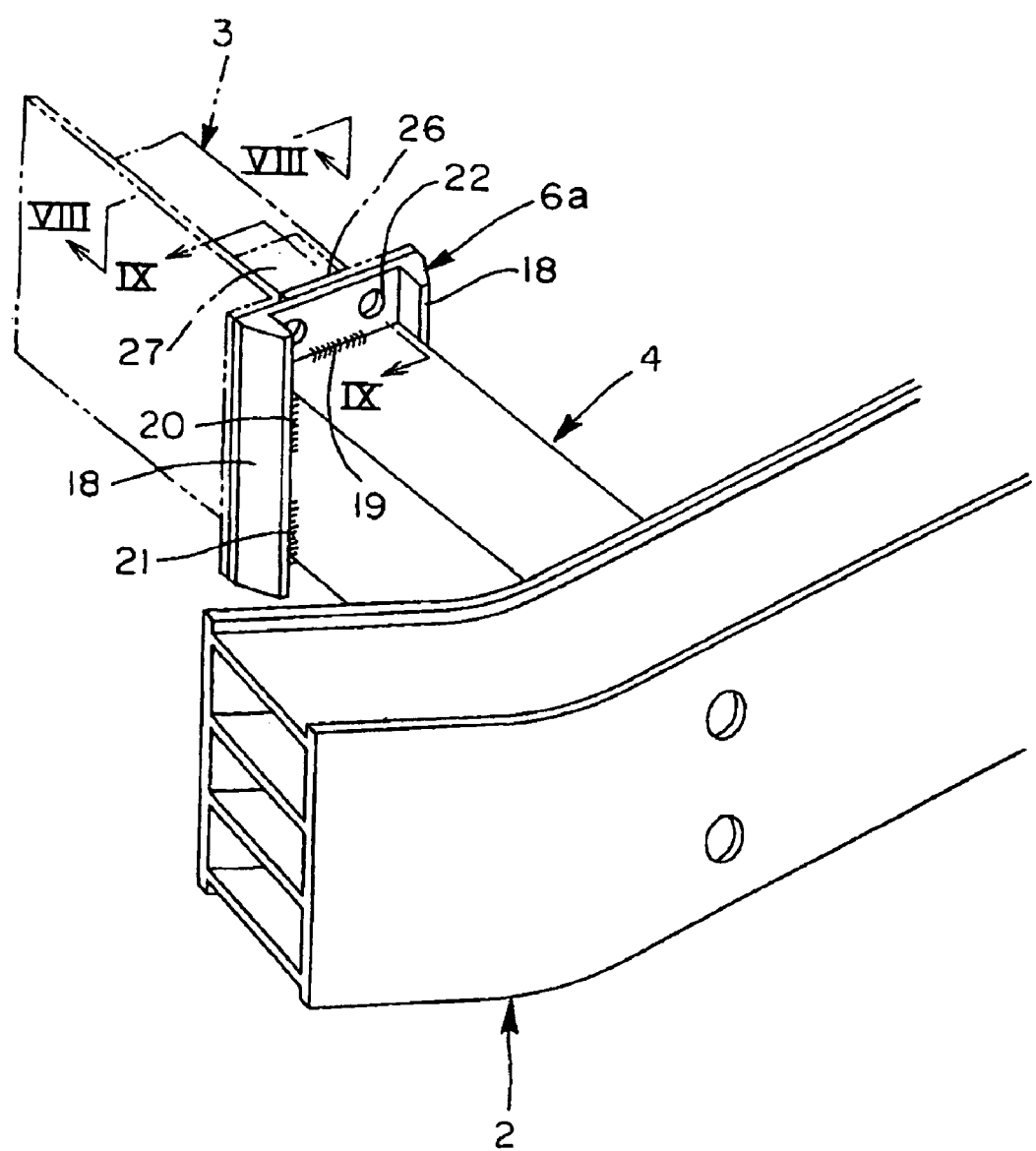
FIG. 6 represents a perspective view of a bumper apparatus according to another embodiment of the present invention.
Figure 10:
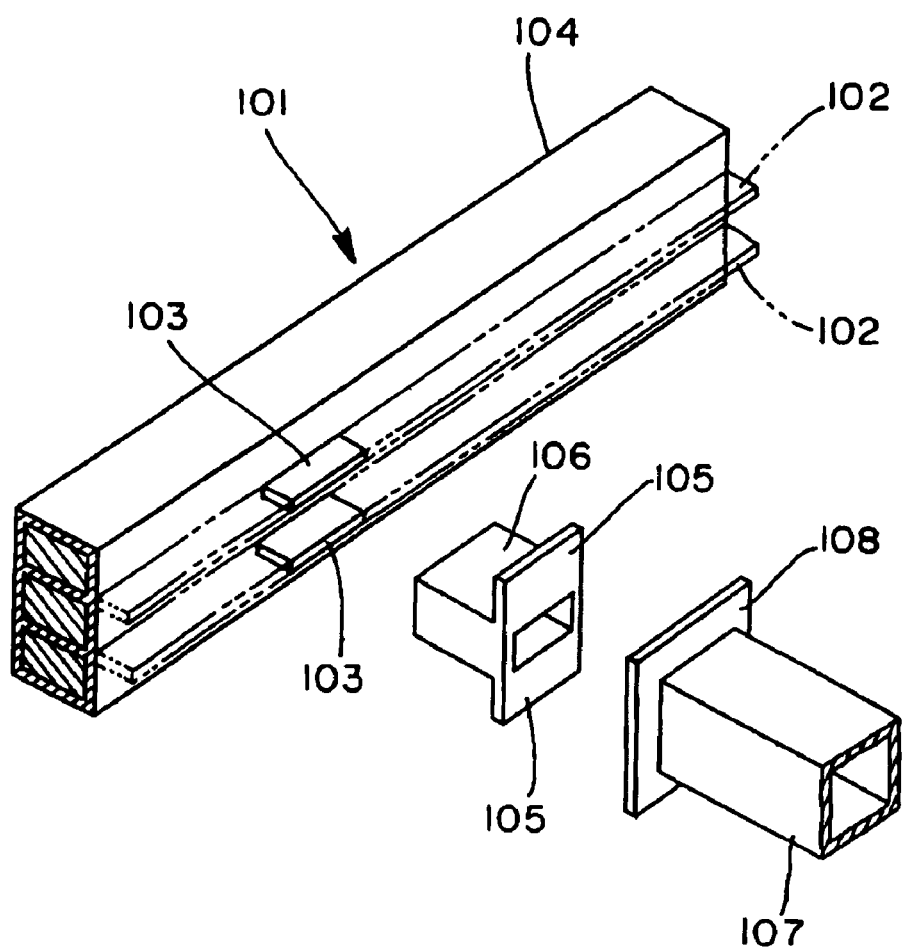
FIG. 10 represents a perspective view of a conventional bumper apparatus.

FIG. 5 illustrates an embodiment in which the above-described embodiment illustrated in FIG. 4 has been slightly modified. As is illustrated in FIG. 5, parts of protruding portions of each press nut 12, 13 are fitted into each hole provided at the first plate 5, but do not protrude from the hole. In this case, which is unlike the embodiment illustrated in FIG. 4, parts of the protruding portions cannot be inserted into the holes provided at the back wall portion 2a of the bumper reinforcement 2. Accordingly, the bumper stay 4 cannot be temporarily attached to the bumper reinforcement 2. In such cases, however, by means of appropriate jigs, the positions of each press nut 12, 13 and each bolt hole can be appropriately adjusted, and each bolt can be engaged with each press nut 12, 13.

The first plate 5 provided in front of the bumper stay 4 further includes a flange portion 14 provided at the side portion of the first plate 5. The press nut 13 is provided at the flange portion 14. The upper and lower portions of the first plate 5 provided in front of the bumper stay 4, and the body of the bumper stay 4, are connected together through a welded portion 15 in a continuous fashion along upper and lower portions of the bumper stay 4. Right and left portions of the first plate 5 provided in front of the bumper stay 4 (in other words, right and left side portions of the one end of the bumper stay 4), and the body of the bumper stay 4, are connected together through welded portions 16, 17 provided intermittently on the right and left portions of the bumper stay 4, excluding the central portions of the right and left portions. The welded portions 16, 17 provided intermittently are effective in terms of preventing the kind of deformation that tends to be generated, by welding, at each of the members, such as the bumper stay 4 and the first plate 5.

The slanting surface portion 11 is provided so as to reduce the contacting surface area of the first plate 5, provided in front of the bumper stay 4, and the bumper reinforcement 2. Accordingly, when a vehicle collides with an object, the impact load is transmitted from the bumper reinforcement 2 to the bumper stay 4 through a contacting area that has been reduced in size. Thus, an excessively strong impact load, which tends to be transmitted to the bumper stay 4 in the initial stages of a collision, can be prevented. Moreover, deformation that occurs at the front end of the bumper stay 4 can stably and gradually progress to the rear portion of the bumper stay 4. In the embodiment illustrated in the figure, a ratio of the slanting surface portion 11 is approximately ⅓ relative to the width of the bumper stay 4. Such a ratio is preferable in terms of alleviating the degree of load transmitted when a vehicle collides with an object. When a vehicle collides with an object, the slanting surface portion 11 starts to make contact with the back of the bumper reinforcement 2 as the one end of the bumper stay 4 deforms, and the size of the area that is subjected to the impact load transmitted becomes larger.

The second plate 6 provided at a rear of the bumper stay 4 includes protruding flange portions 18, 18 for holding the rear end portion of the bumper stay 4. The rear end portion of the bumper stay 4 is held by the flange portions 18, 18. An upper portion and a lower portion of the bumper stay 4 are connected with the second plate 6 by means of welded portions 19, 19 provided, in a continuous fashion, at the upper and lower portions of the other end of the bumper stay 4. Both the right and the left end portions of the second plate 6 are connected with the bumper stay 4 by means of welded portions 20, 21, provided intermittently at the right and the left portions that respectively lack central portions. Welded portion 19 is not limited to being provided over the entire width of the bumper stay 4, but can be provided at only the central portion of the bumper stay 4.

The second plate 6 provided at the rear of the bumper stay 4 can be of a height dimension which is greater than that of the bumper stay 4. In this case, bolt-insertion holes 22, 22, or press nuts (not illustrated), can be provided at right and left portions positioned between the flange portions 18, 18 and at portions above and below the bumper stay 4. Alternatively, an extended portion 23 can be provided at one side of the second plate 6 provided at the rear of the bumper stay 4. In this case, bolt-insertion holes 24, 24, or press nuts (not illustrated), can be provided at the upper and lower portions of the extended portion 23. In the embodiment illustrated in FIG. 1, recessed portions 25 are provided at the top and bottom of the second plate 6 provided at the rear of the bumper stay 4.

The second plate 6 is attached to the side frame 3 in the following way. First, bolts are inserted into the side frame 3 through the bolt-insertion holes 22, 24. Then, nuts (not illustrated) are applied to the bolts. It goes without saying that the press nuts illustrated in FIG. 4 and FIG. 5 can be also utilized.

Figure 3:
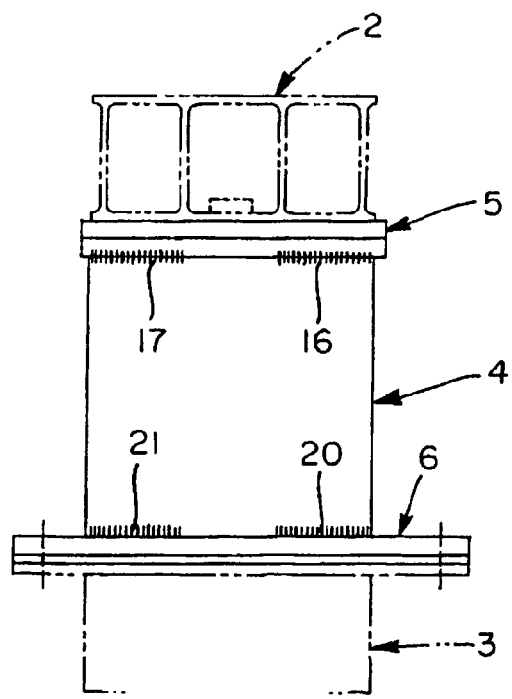
FIG. 3 represents a side view of an example of the bumper apparatus according to the embodiment of the present invention.

FIGS. 6 to 9 illustrate an additional embodiment of the present invention. In the embodiment, the bumper reinforcement 2 and the bumper stay 4 utilized are identical to those used in the embodiment illustrated in from FIGS. 1 to 3. A second plate 6a provided at a rear of the bumper stay 4 is formed so that an extended portion 23 of the second plate 6, provided at the rear end of the bumper stay 4 illustrated in FIG. 1, can be cut off.

The second plate 6a is fastened by means of bolts to a base plate 26 that has been secured. Thus, the second plate 6a provided at the rear of the bumper stay 4 is attached to the side frame 3. The base plate 26 includes a fastening portion 27. The fastening portion 27 is welded, or fastened by means of bolts, to upper and lower walls of the side frame 3 (illustrated in FIG. 9). For fastening the second plate 6a, press nuts illustrated in FIG. 4 and FIG. 5 can also be utilized.

Unlike the embodiment illustrated in FIG. 1, because an extended portion 23 is not fastened to the side frame 3 by use of a bolt-insertion hole 24, the flange 18 can be deflected by the impact load applied by a collision of a vehicle in a diagonal direction, accordingly, the degree of concentration of stress applied to the welded portions 20, 21 can be accordingly reduced, and breakages of welded portions can be further prevented.

According to an aspect of the present invention, a first plate provided in the front of a bumper stay and a second plate provided at the rear of the bumper stay are welded to both ends of a body of the bumper stay. At least the first plate includes a press nut. The bumper stay is fastened to a bumper reinforcement and a side frame by means of bolts. Preferably, the first and the second plates can include flanges contacting with side surfaces of the body of the bumper stay. The bumper stay and the first plate or the second plate can be welded together by welding the flanges to the body of the bumper stay.

According to the aspect of the present invention, upper and lower, right and left portions of the bumper stay, in other words, a portion to which impact load is applied, can be joined by means of welding. Therefore, joints between the bumper stay and the bumper reinforcement, or between the bumper stay and the side frame, does not develop cracks. In addition, because the bumper stay is fastened to the bumper reinforcement by means of screwing a bolt to the press nut that has been pressed to the first plate from a back wall portion of the bumper reinforcement, the fastening operations become much simple.

According to a further aspect of the present invention, in events of a vehicle collision, a first plate of a bumper stay deforms without concentrations of stress applied to a particular position, which restricts development of cracks. Because the bumper stay to which the first plate and the second plate have been welded is fastened to the bumper reinforcement and a side frame by means of a bolt, fastening operation becomes much simple. In particular, because the bolt is engaged with the press nut that has been pressed to the first plate through a wall portion of the bumper reinforcement, an assembling operation of the bumper stay to the bumper reinforcement becomes also simple.

According to a further aspect of the present invention, a press nut for fastening a first plate, provided in the front of a body of a bumper stay, to a bumper reinforcement is provided in a body of the bumper stay. Further, a press nut for fastening a second plate, provided at the rear of the body of the bumper stay, to a side frame is provided outside the body of the bumper stay. Accordingly, concentration of stress that tends to concentrate to welded portion, and weld cracks those tend to develop at the welded portion, can be avoided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A bumper apparatus for a vehicle, comprising:
   a bumper reinforcement extending in a vehicle width direction; and
   a bumper stay fastened to one side of the bumper reinforcement and including a body extending in a front-rear direction of a vehicle and a first plate fastened to one end of the body, the first plate including a contacting surface portion provided along the bumper reinforcement, a slanting surface portion branching from the bumper reinforcement, a first flange portion extending outside the body of the bumper stay, and second flange portions provided at both side ends of the first plate contacting with side surfaces of the body of the bumper stay.

2. The bumper apparatus for a vehicle according to claim 1, wherein
   a press nut is provided at at least one of the contacting surface portion of the first plate and the first flange portion of the first plate, the one side of the first plate is fastened to the one end of the body by means of welding, and the other side of the first plate is fastened to the one side of the bumper reinforcement by means of a bolt engaging with the press nut through a back wall portion of the bumper reinforcement.

3. The bumper apparatus for a vehicle according to claim 2, wherein
   the first plate is fastened to the one end of the body of the bumper stay at least between the second flange portions and both sides of the body of the bumper stay contacting with the second flange portions.

4. The bumper apparatus for a vehicle according to claim 2, wherein
   the first plate is fastened to the one end of the body of the bumper stay at least between the contacting surface portion of the first plate and the one end of the body of the bumper stay.

5. The bumper apparatus for a vehicle according to claim 3, wherein
   the first plate is fastened to the one end of the body of the bumper stay at least between the contacting surface portion of the first plate and the one end of the body of the bumper stay.

6. The bumper apparatus for a vehicle according to claim 2, wherein
   a part of the press nut provided at at least one of the contacting surface portion of the first plate and the first flange portion of the first plate protrudes from the first plate, and the part of the press nut protruding is inserted into a hole provided at the back wall portion of the bumper reinforcement.

7. The bumper apparatus for a vehicle according to claim 2, wherein
   a second plate extending in up and down direction of the body of the bumper stay is welded onto the other end of the body of the bumper stay, the second plate including a press nut and/or a bolt-insertion hole at a portion extending in up and down direction of the body of the bumper stay.

8. The bumper apparatus for a vehicle according to claim 7, wherein
   the second plate includes third flange portions contacting with the both sides of the body of the bumper stay.

9. The bumper apparatus for a vehicle according to claim 8, wherein
   the body of the bumper stay, the first plate, and the second plate are made by a process of extrusion molding of aluminum alloy.

10. A method for assembling a bumper apparatus for a vehicle comprising a bumper reinforcement extending in a vehicle width direction and a bumper stay including a body extending in a front-rear direction of a vehicle and a first plate provided at one end of the body, and fastened to one side of the bumper reinforcement, comprising the steps of:
    pressing a press nut to the first plate;
    making contact of one side of the resulting first plate with one side of the body of the bumper stay;
    welding the one side of the first plate onto the one end of the body of the bumper stay;
    making contact of the other side of the first plate with the one side of the bumper reinforcement; and
    fastening the first plate to the bumper reinforcement through a back wall portion of the bumper reinforcement by means of a bolt engaging with the press nut.

11. The method for assembling a bumper apparatus for a vehicle according to claim 10, wherein
    the first plate includes flange portions contacting with side surfaces of the body of the bumper stay in the step of making contact of the one side of the first plate to which the press nut has been pressed with the one end of the body of the bumper stay.

12. The method for assembling a bumper apparatus for a vehicle according to claim 11, wherein
    in the step of welding the one side of the first plate onto the one end of the body of the bumper stay, at least the flange portions of the first plate is welded onto the side surfaces of the body of the bumper stay.

13. The method for assembling a bumper apparatus for a vehicle according to claim 10, wherein
    the press nut pressed to the first plate in the step of pressing a press nut to the first plate protrudes from the first plate, in the step of making contact of the other side of the first plate with the one side of the bumper reinforcement, a portion of the press nut protruding from the first plate is inserted into a hole provided at a back wall portion of the bumper reinforcement.

14. The method for assembling a bumper apparatus for a vehicle according to claim 10, wherein
    the body of the bumper stay and the first plate are made by a process of an extrusion molding of aluminum alloy.

15. The bumper apparatus for a vehicle according to claim 1, wherein
    a second plate extending in up and down direction of the body of the bumper stay is welded onto the other end of the body of the bumper stay, the second plate including a press nut and/or a bolt-insertion hole at a portion extending in up and down direction of the body of the bumper stay.

16. The bumper apparatus for a vehicle according to claim 15, wherein
the second plate includes third flange portions contacting with both sides of the body of the bumper stay.

17. The bumper apparatus for a vehicle according to claim 16, wherein
the body of the bumper stay, the first plate, and the second plate are made by a process of extrusion molding of aluminum alloy.

* * * * *